United States Patent
Hasner

(10) Patent No.: US 9,411,874 B2
(45) Date of Patent: Aug. 9, 2016

(54) SIMPLIFIED INTERACTION WITH COMPLEX DATABASE

(75) Inventor: Jason Steven Hasner, Ammon, ID (US)

(73) Assignee: Melaleuca, Inc., Idaho Falls, ID (US)

( * ) Notice: Subject to any disclaimer, the term of this patent is extended or adjusted under 35 U.S.C. 154(b) by 426 days.

(21) Appl. No.: 13/523,502

(22) Filed: Jun. 14, 2012

(65) Prior Publication Data

US 2013/0339291 A1    Dec. 19, 2013

(51) Int. Cl.
*G06F 17/30* (2006.01)

(52) U.S. Cl.
CPC ................. *G06F 17/30592* (2013.01)

(58) Field of Classification Search
None
See application file for complete search history.

(56) References Cited

U.S. PATENT DOCUMENTS

| | | | |
|---|---|---|---|
| 6,173,310 B1 | 1/2001 | Yost et al. | |
| 6,269,393 B1 | 7/2001 | Yost et al. | |
| 6,279,033 B1 * | 8/2001 | Selvarajan et al. | 709/217 |
| 6,996,569 B1 | 2/2006 | Bedell et al. | |
| 7,330,847 B2 | 2/2008 | Saylor et al. | |
| 2004/0260671 A1 | 12/2004 | Potter | |
| 2005/0060300 A1 * | 3/2005 | Stolte et al. | 707/3 |
| 2007/0022093 A1 * | 1/2007 | Wyatt et al. | 707/2 |
| 2007/0027904 A1 | 2/2007 | Chow | |
| 2007/0294269 A1 * | 12/2007 | Ma et al. | 707/100 |
| 2009/0327330 A1 * | 12/2009 | Abouzied et al. | 707/102 |
| 2010/0076977 A1 | 3/2010 | Wyatt | |
| 2011/0055146 A1 | 3/2011 | Mahajan | |
| 2011/0213751 A1 | 9/2011 | Iorio | |
| 2013/0166498 A1 * | 6/2013 | Aski et al. | 707/602 |

OTHER PUBLICATIONS

"OLAP Cube", Computer Desktop Encyclopedia, The Computer Language Company, retrieved on Dec. 15, 2014 from: http://lookup.computerlanguage.com/host_app/search?cid=C999999&term=OLAP+cube&lookup.x=0&lookup.y=0.*
"OLAP", Computer Desktop Encyclopedia, The Computer Language Company, retrieved on Dec. 15, 2014 from: http://lookup.computerlanguage.com/host_app/search?cid=C999999&term=OLAP&lookup=Go.*
"Pivot table", Computer Desktop Encyclopedia, The Computer Language Company, retrieved on Dec. 15, 2014 from: http://lookup.computerlanguage.com/host_app/search?cid=C999999&term=pivot+table&lookup.x=0&lookup.y=0.*
"Microsoft SQL Server Analysis Services," retrieved on Dec. 15, 2014 from: http://msdn.microsoft.com/en-us/library/bb522607.*
"API"; Computer Desktop Encyclopedia; The Computer Language Company; retrieved on Sep. 29, 2015 from: http://lookup.computerlanguage.com/host_app/search?cid=C999999&term=API&lookup.x=0&lookup.y=0.*
"Data providers used for Analysis Services connections"; Microsoft; 2015; retrieved on Sep. 29, 2015 from: https://msdn.microsoft.com/en-us/library/dn141152(d=printer).*
International Search Report and Written Opinion for PCT/US2013/045939, mailed Feb. 18, 2014, 10 pages.

* cited by examiner

*Primary Examiner* — Alex Gofman
*Assistant Examiner* — Umar Mian
(74) *Attorney, Agent, or Firm* — Fish & Richardson P.C.

(57) ABSTRACT

A computer-implemented method for processing data in a database using a data cube is discussed and involves interacting with a user of a computing device, using a computer application, to obtain meta data about a database and obtain user-defined selections of options concerning the database; creating a data cube definition by using the selected options to identify characteristics of columns in the database; publishing to an OLAP engine a definition of a data cube that corresponds to the data base; generating a simplified flat-file model of the data in the data cube; and providing the simplified flat-file model in a form that can be reviewed and directly manipulated by the user.

21 Claims, 5 Drawing Sheets

SIMPLIFIED INTERACTION WITH COMPLEX DATABASE

TECHNICAL FIELD

This document relates to mechanisms by which users can obtain information from a complex database, such as using a data cube for querying the database.

BACKGROUND

Computer databases take a variety of forms and allow various users to query data in numerous manners. For example, a typical business may have a data that tracks information about sales and customers, including contact information for each customer, profile information about each customer (e.g., geographic area where the customer is located, whether the customer is an organization or an individual, etc.), data about particular products that were sold, quantities sold, times of the sales, and the like. One simple way to store such data is in the form of a multi-dimensional table, such as a spreadsheet.

To increase flexibility in storing data, a relational database may be employed. Such a form of database relates data across multiple different tables. For example, one table may relate customer numbers to particular characteristics of each customer (e.g., name, address, password for a web site, etc.). Another table may relate transaction numbers to certain parameters, including the customer number of the customer that took part in the transaction. Thus, the information about a particular customer need not be stored for each transaction, as the customer number can be used in any given transaction to locate the related customer information quickly.

For complex data analysis, it is common to use an online analytic processing (OLAP) data cube, which is a data structure that permits fast analysis of data. The cube can be thought of as an extension of a two-dimensional spreadsheet into three or more dimensions, made up of numeric facts known as "measures" that are categorized by "dimensions." For example, a cube could be established for a sales organization, whose dimensions are products sold (listed, e.g., by product number), time at which the sales were made (listed, e.g., by month or quarter or day), and geographic region into which the sale was made (listed, e.g., by state or zip code). Such OLAP techniques are commonly used for business intelligence and data mining applications. While such techniques are powerful, however, they can often be complex—too complex for workers who are not trained in database technologies.

SUMMARY

This document discusses systems and techniques for analyzing data in a complex database in manners that can be mastered by typical computer uses who are not database specialists. In particular, as discussed in examples below, an application may be provided in a database system that interacts with a user in a relatively simple manner to acquire parameters from the user that define data the user wants to access, and then causes a database and an OLAP engine to cooperate to generate a data cube that is responsive to the user's requests. The application may then obtain data form the data cube and transform it into a more simplified data structure such as by generating a spreadsheet that contains the user's data. The application may then automatically email or otherwise communicate the spreadsheet to the user so that the user may manipulate the data on the spreadsheet in a manner that is more familiar to a typical computer user.

The systems and techniques described here may, in certain implementations, provide one or more advantages. For example, "civilian" employees in a company (i.e., those who are not database administrators) may be empowered to perform their own complex data analysis on data stored by the company, such as detailed sales data. As a result, such employees may avoid being limited to received pre-defined reports that have been written by database specialists to addressed generalized desires of the company, but might not be relevant to a particular concern for a particular employee. Also, an employee can obtain the data without receiving intervention from a specialist, and can thus perform more queries, obtain data after hours, obtained refined data after interacting with a first set of data, and obtain other advantages that inure when employees are empowered to handle their own data.

In one implementation, a computer-implemented method for processing data in a database using a data cube is disclosed. The method comprises receiving, at an application executing on a computer system, a request from a user for a report relating to a group of data in a database; querying the database with the application to obtain meta data about the group of data, and providing the meta data for review by the user; receiving from the user and by the application, selections of options concerning the group of data; and querying the database with the application to identify characteristics of columns in the database. The method also involves using the identified characteristics to create a data cube definition with the application; publishing, with the application, the data cube definition and other information about the group of data to an online analytical processing (OLAP) engine that is separate from the application; receiving, at the application and from the OLAP engine, data that represents a data cube for the group of data; generating, from the data received from the OLAP engine, a simplified flat-file model of the group of data; and providing the simplified flat-file model in a form that can be reviewed and directly manipulated by the user.

In certain aspects, the simplified flat-file model comprises a computer spreadsheet to which the user is given access. Also, the method can additionally include, after receiving the selection of options from the user, notifying the user that the simplified flat-file model will be provided in the future, and allowing the user to interact with the application while the simplified flat-file model is generated. Moreover, generating the simplified flat-file model can comprise mapping data from the data cube to a spreadsheet pivot table, providing the meta data for review by the user can comprise providing fields from a report to the user, and receiving selections of options concerning the group of data from the user can comprise receiving one or more commands from the user to filter the fields for ranges identified by the user. In addition, querying the database with the application to identify characteristics of columns in the database can comprise creating a measure group for aggregatable columns. In certain examples, querying the database with the application to identify characteristics of columns in the database comprises creating a cube dimension for columns determined to have a finite number of values.

In yet other aspect, publishing the data cube definition and other information comprises creating data cube dimensions; defining a report based on the user selections of options; creating relationships between the group of data and a data source for the dimensions; and creating one or more measures for the cube. The method can also involve identifying with the application dimensions that are preexisting on a server system and re-using dimensions that are identified as being preexisting on the server rather than recreating the preexisting dimensions.

In another implementation, a computer-implemented method for processing data in a database using a data cube is disclose that comprises interacting with a user of a computing device, using a computer application, to obtain meta data about a database and obtain user-defined selections of options concerning the database; creating, with the application, a data cube definition by using the selected options to identify characteristics of columns in the database; publishing, from the application to an online analytical processing (OLAP) engine that is separate from the application, a definition of a data cube that corresponds to the data base; generating, by the application and from data received from the OLAP engine in response to the publishing, a simplified flat-file model of the data in the data cube; and providing the simplified flat-file model in a form that can be reviewed and directly manipulated by the user. The simplified flat-file model can comprise a computer spreadsheet to which the user is given access. Also, obtaining meta data about the database can comprise identifying characteristics of columns in the database by creating a measure group for aggregatable columns.

In some aspects, obtaining meta data about the database comprises identifying characteristics of columns in the database by creating a cube dimension for columns determined to have a finite number of values. Also, publishing the data cube definition can comprise creating data cube dimensions; defining a report based on the user selections of options; creating relationships between the group of data and a data source for the dimensions; and creating one or more measures for the cube. The method can additionally involve identifying with the application dimensions that are preexisting on a server system and re-using dimensions that are identified as being preexisting on the server rather than recreating the preexisting dimensions.

In yet another implementation, a computer-implemented automatic data manipulation system is disclosed. The system comprises a relational database storing data in a plurality of interrelated tables of data; an online analytical processing (OLAP) engine arranged to communicate with the relational database and process data from the relational database into a data cube; and an application that is separate from the database and the OLAP engine, and that is programmed to: interact with a user of the system to obtain meta data about the database and obtain user-defined selections of options concerning the database; create a data cube definition by using the selected options to identify characteristics of columns in the database; publish the data cube definition to the OLAP engine; generate, from data received from the OLAP engine in response to the publishing, a simplified flat-file model of the data in the data cube; and provide the simplified flat-file model in a form that can be reviewed and directly manipulated by the user. The simplified flat-file model may comprise a computer spreadsheet to which the user is given access, and the step of obtaining meta data about the database can comprise identifying characteristics of columns in the database by creating a measure group for aggregatable columns In some aspects, obtaining meta data about the database comprises identifying characteristics of columns in the database by creating a cube dimension for columns determined to have a finite number of values. Also, publishing the data cube definition can comprise creating data cube dimensions; defining a report based on the user selections of options; creating relationships between the group of data and a data source for the dimensions; and creating one or more measures for the cube. Moreover, the application can be further programmed to identify database dimensions that are preexisting on a server system and re-use dimensions that are identified as being preexisting on the server rather than recreating the preexisting dimensions.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
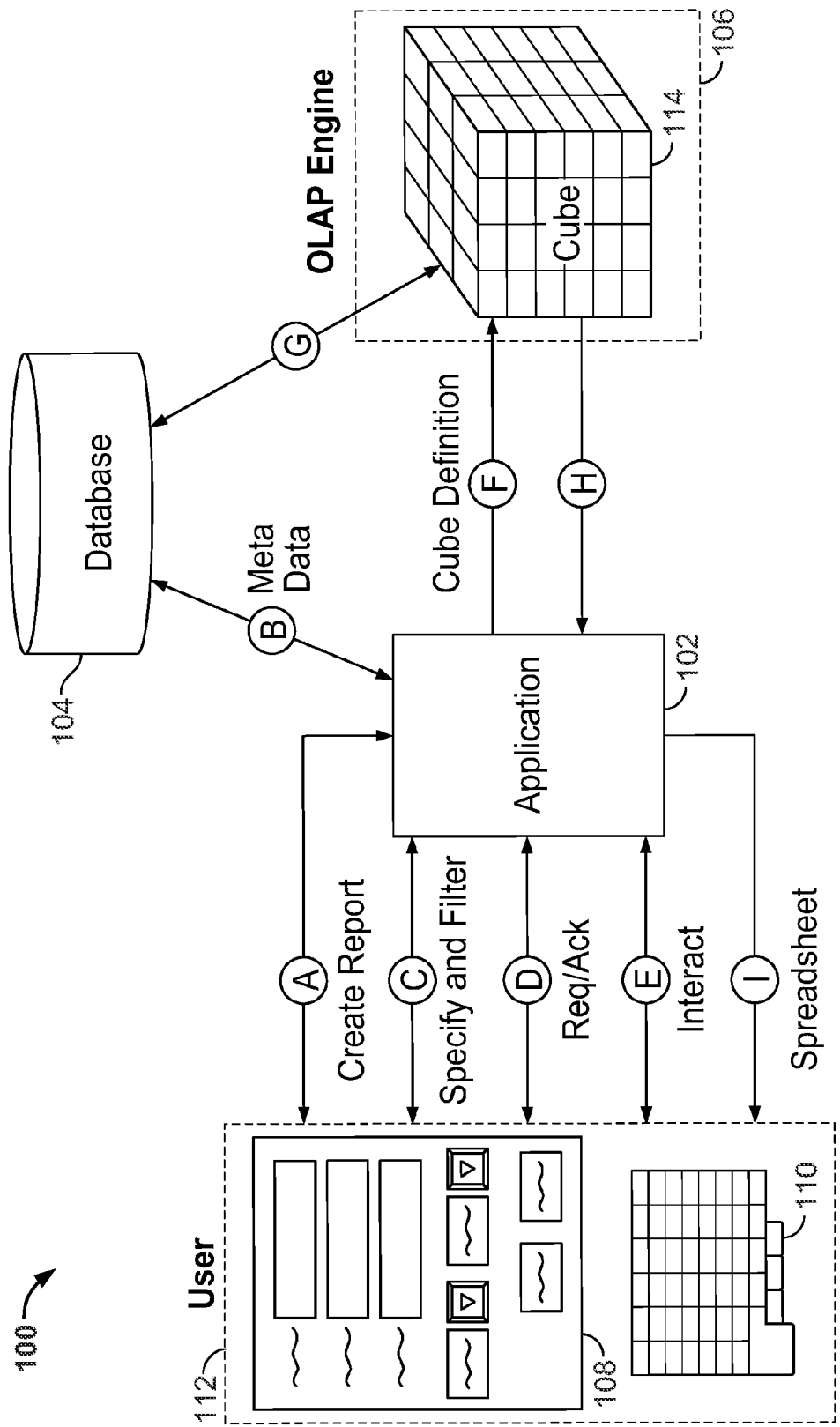
FIG. 1 shows a conceptual diagram of a computer system and process for accessing data in a complex database.

In this document, systems and techniques are discussed that permit useful actions to be performed on data that is in a complex database such as a relational database that is rendered into a data cube, or hypercube, such as by an OLAP engine. In general, the techniques include providing a user interaction interface that is arranged to obtain information from a non-administrator user to create a report that the use would like to review, such as a report that shows information about sales by a company over a defined time period. Such interaction may be controlled by an application that is separate from the relational database and the hyper cube FIG. 1 shows a conceptual diagram of a computer system 100 and process for accessing data in a complex database. In general, the system 100 shows a number of components that may interact so that a computer user who does not have training in the operation of databases can nonetheless perform relatively complex data manipulation on such data. In particular, in the implementation shown here, an application 102 may interact with a user 112 so that the user can review data from a data cube 106, which generally requires higher levels of skill to manipulate.

In the system 100, a database 104 stores the data from which the user 112 wishes to obtain useful information. For example, the database may, in certain implementations, store sales data for a corporate organization. Such data include tables that represent particular customers, and include a customer ID, customer address and telephone number, customer name, customer discounts, and other information about particular customers. Also, the database 104 may include tables for particular products sold by the organization to customers. For example, such tables may include item IDs, item descriptions, pricing for particular items (singular and group), shipping information (e.g., the weight of an item), and the like. In addition, other tables may track particular transactions. Such tables may contain pointers to the customer for the particular transaction, and pointers to product records for products ordered by the customer. Such tables may also reflect the total cost of an order, the shipping method used for the order, a date and time at which the order was placed, an individual at the customer who placed the order, a unit of the customer that is to receive the order, the tax charged for the order, and the like.

The database 104 itself may take one of a number of familiar forms, and will typically involve one or more relational database management systems (RDMSs). The database engine may include, for example, ORACLE, MICROSOFT SQL SERVER, IBM DB2, MySQL, and other such RDMSs. The form of a particular database instance within the database 104 will depend on typical considerations and the application to which the database 104 is being put. The particular arrangement of the database instance is not critical here, the system 100 described here may work with a wide variety of database organizations.

The online analytical processing (OLAP) engine 106 may also take a variety of forms. The OLAP engine 106 is generally responsible for building, querying, and managing a data cube of a familiar form. Such engines are typically suited for analyzing very large databases of information from many different angles, and are frequently referenced in relation to data warehousing or other such data management concepts, including fast analysis of shared multidimensional information (FASMI). Examples of OLAP engines include MICROSOFT's SQL SERVER ANALYSIS SERVICES (SSAS), ORACLE OLAP, IBM COGNOS BI and FPM, SAP BUSINESS OBJECTS, and MICROSTRATEGY. The OLAP engine 106 is arranged to obtain data for building data cubes from database 104.

In this particular implementation, the database 104 and OLAP engine 106 are supplemented by a separate application 102 that is aimed at automatically interacting with and controlling the OLAP engine 106 and database 104 in response to instructions from the user 112, rather than having the user 112 deal directly with the database 104 and/or OLAP engine 106. The application 102 may act as an ad hoc query tool for users who are not trained in database management-ad hoc because an untrained user can, via the application 102, obtain data in a form that is usable to an ordinary computer user, without needing to route their requirements through a trained database administrator.

The user 112 interacts with the application 102 through a form 108 that may take a simplified form through which the user can define information that the user needs from the system 100. Particular examples are discussed below in FIG. 4. For example, a user may be permitted to identify the various fields that they would like to review, the ranges or values for those fields (e.g., time or geographic ranges for sales data), and other similar information that will be readily understandable to a lay user (identified here as someone who infrequently interacts with database 104 and does not have special training for formulating database queries, such as typical employees in an organization who are not part of an organizational IT or programming department). The forms may be generated according to business logic that is particular for the organization that uses database 104, such as to address particular issues that are commonly faced by lay users who need basic data to perform their jobs.

A spreadsheet 110 is the manner, in this example, that user 112 obtains his or her requested information. A spreadsheet is type of data source that most lay users can manipulate without specific training, and that they feel comfortable interacting with. Also, by placing the data into a spreadsheet 110, the system 100 may further empower the user to look more deeply at the data, as the user will be able to use spreadsheet operations with which he or she is familiar, in order to analyze the data. The spreadsheet 110 may be generated so as to have a built in OLAP cube browser that allows interaction with the cube 114, by placing the data in the spreadsheet 110 in the format of a pivot table.

Certain lettered arrows in the figure show an exemplary process flow that may be part of a typical use of system 100. In this example, the letters on the arrows represent a chronological order or communications that may occur between the components of the system 100.

Starting with arrow A, it is shown that the user 112 initially accesses the application 102 with a command to begin creating a report about data in the database 104. Such a command may occur by the user 112 accessing a web page implemented by the application 102 (which may include a number of separate program modules or sub-applications that cooperate to provide the functionality described above and below) and beginning to fill out the web page with information needed to access the data, the command may also occur by the user launching a front-end application or his or her computed that is programmed to interact with a user to obtain data from data base 104 through the data cube 114.

The user 112 may also define certain parameters about the type of data he or she wants to review. For example, a user may be interested in determining whether there is a link between order size, order method, and language (e.g., English, Spanish, etc.) for all the orders placed using a web site, which is operated by the user's employer, or by phone in 2007. Such a request may be entered by the user identifying fields in the database 104 that relate to such factors, where the user 112 may be shown all the fields that have been determined to be possibly relevant to such a user and may pick those fields that are relevant to the user's current endeavor. The names of the fields may be the actual names in database 104 or may be revised names that are easier for a lay user to understand.

Arrow B shows the application 102 obtaining meta data form the database 104 in response to the user request. For example, the application 102 may query the database for meta data needed to build a query that will return order information to the user 112.

As shown by arrow C, the user 112 may then be presented with options that allow the user 112 to filter a report so that only the orders that the user cares about analyzing are included (e.g. only return orders that were placed last year). The user may also select options to have additional information from the database 104 included in an ultimate report that is generated for the user 112 by the system 100, such as by adding information about the language spoken by the particular customer for each returned order. With each change and update provided by the user 112, the user 112 may be shown a preview of the report that will be generated, and can thus further refine the report until it meets the user's particular objective and answers the user's original question. In the example discussed here, the goal may have been to have a report that identifies of all phone and web orders that were placed last year to the user's employer. Such a report would include fields for the order method, the invoice amount, and the customer's language.

At arrow D, the report is in a proper form, and the user 112 instructs the application 102 to cause a data cube and spreadsheet 110 to be generated using data from database 104 according to the content and format of the report specified by the user. The application 102 then responds with an acknowledgement. Because it can take a long time to form a data cube, the application may notify the user 112 that a spreadsheet 110 will be forthcoming, so that the user 112 does not believe that he or she will see it immediately. The application 102 may also look at the number of fields, the types of relationships involved in the user's report, and the size of the database 104 in order to generate an estimate for the amount of time it will take in order to generate the data cube 114 and the spreadsheet 110, and may accompany the acknowledgement to the user with such information. The application 102 may also query the database 104 and/or the OLAP engine 106 in order to get such a time estimate, and may forward the estimate to the user 112 (who may be using a personal computer, smartphone, or other form of computer, or computing device).

As shown by arrow E, the further operations may occur in a separate process from the user's 112 interaction with the application 102, so that the user 112 may continue to interact with the application 102 even while the application 102 is separately processing the user's 112 initial request. In the back-side process, shown further by arrow B, the application 102 queries the database 104 in order to find out more information about the columns that are included in the report that the user 112 specified. For example, certain columns may be aggregatable—e.g., something that can be averaged, counted, and/or summed. For such columns, the application 102 may create a cube measure group that contains a measure for each aggregation that can be performed on the column. For example, if "Invoice Amount" were a column in this report, the application 102 would create a measure group called "Invoice Amount" that would include "Sum of Invoice Amount", "Average of Invoice Amount", etc. as measures. Other columns may have a finite number of values, such as a column reciting the method under which the order was taken (e.g., mail order, telephone, or internet). Such a parameter may be determined by identifying that a few values repeat over a large set of records, or by determining that the value for the field in the database has defined and discrete values that it can take. For such columns, the application 102 can create a cube dimension that will be used to group the various measures when the data is analyzed. Also, in many instances, dates in the database may be used to create cube dimensions.

The application 102 then provides a cube definition to the OLAP engine 106, along with required support information. If certain required dimensions already exist, they can be re-used and if they do not exist on the server system, they can be created. With the dimensions created and processed, they may be saved so that cubes to be created in the future may look for them and reuse them, so as to improve processing speed. The process may also define the report, or data set, that the user created, and point the OLAP engine to the data in the data base 104. In addition, the process may create relationships between the data set and each relevant dimension's data source. Finally, the process may create the relevant measure groups and measures for the data cube.

At arrow G, the OLAP Engine then goes about constructing the data cube using data from the database 104. The application 102 may, in appropriate circumstances, instruct the OLAP Engine 106 to perform such actions so as to maintain the process described here as being an automatic process. In response to the instruction, the OLAP engine requests the report's data from the DB, and uses the cube definition and data to process the cube. The amount of processing time that is needed will be a function of the amount of data in the report, how quickly the database 104 can get the data to the OLAP engine 106, and the complexity of the cube definition (for example, Count Distinct is a more computationally expensive aggregation function than is Sum). As noted above, an estimate of the processing time may be made initially, and may be provided to the user 112.

At arrow H, when the cube has finished processing, the cube data may be passed to the application 102. The application 102 may then process the received cube data by opening a spreadsheet or other form of simplified database with which a lay user may readily interact. The application may establish individual sheets within the spreadsheet and may also establish columns in the spreadsheet to correspond to columns in the database 104, though with aggregated data and other data as process by the cube 114 and OLAP engine 106. Formulas and relationships within the spreadsheet may also be established to reflect such formulas and relationships in the database 104 and, by extension, the data cube 114.

With the spreadsheet created, the application 102 can then send the spreadsheet to the user 112, as indicated by arrow I. For example, the application 102 can send an electronic mail message to an account for the user 112, and may attach the spreadsheet to the message or include a hyperlink in the message that points to the spreadsheet where it is stored on a central server system. The user can then open the spreadsheet and interact with it in various manners that will be known to an experienced spreadsheet user who is not an experienced database user (e.g., such as the ability to execute SQL queries).

Thus, by the techniques discussed here, the system 100 may take data that is stored in a relatively complex manner in database 104, and select appropriate data that has been specified through the form 108 by a user. The system 100 may take advantage of the cube 114 format in order to process large amounts of the data more quickly and flexibly. And the application 102 may then take the resulting data and simplify its form into a spreadsheet 110 that the user 112 can edit and otherwise manipulate directly, such as by a spreadsheet that the user 112 may save to a storage location local to his or her particular client device, or to a networked location available only to the user and certain co-workers, in order to better massage the data in a form that is designed to be simple and broadly understood by the lay computing population.

Figure 2:
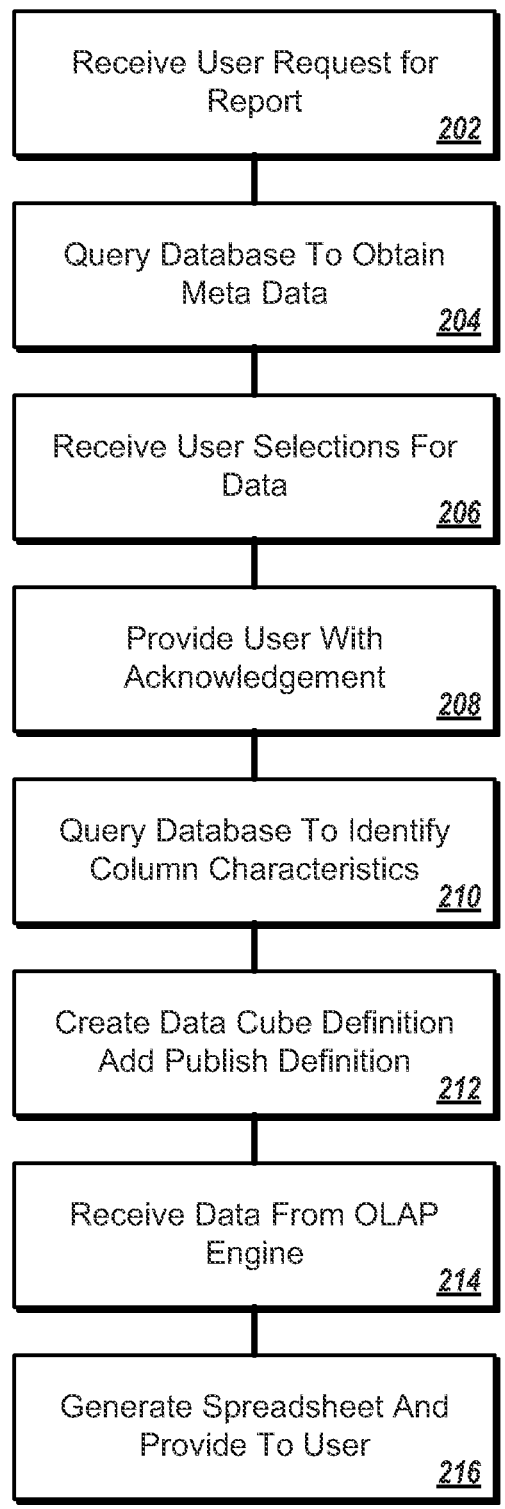
FIG. 2 is a flow chart for managing data access with a coordinating application.

FIG. 2 is a flow chart of a process for managing data access with a coordinating application. The process may be performed by a system such as the system 100 shown in FIG. 1, and the process is similar to that discussed above in FIG. 1—though more detail is shown here surrounding actions that may be performed in certain implementations by a component (termed a "central managing component" here because it is separate from typical components in such a system but interacts with each of such major components) or components such as application 102.

The process begins at box 102, where a user request for a report is received. The request may occur in a variety of manners and may also involve interaction with the user, by which the user identifies the sort of report that the user would like to obtain. In particular, a user can identify or otherwise describe the database tables and/or database fields that the user wants queried to produce the report, and may also describe or select where the relevant database is located. (In certain instances, an application may give the user access to only a single database, so that specification of the database by the user would be unnecessary.)

At box 204, the central managing component may take the information received form the user and may query the target database to obtain meta data about the database. For example, where the user simply identifies a database or a sub-part of the database, the central managing component may obtain descriptors of each of the fields in that portion of the database, as well as information that defines relationships between and among tables in the database. The central managing component can also identify other factors about the fields, such as format of each field (e.g., textual, floating point, integer, etc.) and the main values in each of the fields (e.g., the type of order for an orders database, which may take a small number of distinct values).

At box 206, the process receives user selections for the data. For example, the user may specify particular fields that they would like in a spreadsheet, along with ranges for those fields. For example, a user may choose to see an "Order Date" field for orders that have been placed with a company, and may choose to see only orders placed in the most recently finished quarter. The user may continue making such adjustments for whatever fields or other information the user wishes to receive, and may ultimately submit the report definition as finalized in order to obtain a spreadsheet that corresponds to the user-defined report.

The process may then begin preparing the data for direct review by the user. Before or around the time of preparing the data, the process may acknowledge that it has received the user's defined report, and may explain to the user that the data will be processed in the background, that the user will be notified when it has been processed, and perhaps also provide the user with an estimate for how long it will likely take to process the data (box 208).

At or around the same time, the central managing component may then query the database to identify characteristics of columns or fields in the database (box 210). Such identified characteristics, as discussed above, may involve determining whether particular columns are aggregatable or take on an identifiable, limited number of values. Other characteristics of the relevant portions of the database may also be identified in this preparatory phase, though information may also or alternatively be obtained in later phases of the process.

At box 212, the central managing component creates a definition for a data cube using the column information and other information obtained from the database using the report that the user generated and specified. Such a definition may involve mapping the parameters selected by the user into a data cube definition form that is supported by an OLAP engine system that is being used to generate the data cube.

At box 214, the central managing component receives data back from the OLAP engine. After the central managing component submitted the cube definition and other information, it may have waited in its process for the information to return from the OLAP engine. Upon receiving an indication that the data cube has been completed, the central managing component can access the data cube to identify its structure and contents. The central managing component may query the data cube to extract content from it, and may instantiate a copy of a spreadsheet, such as a MICROSOFT EXCEL, GOOGLE DOCS AND SPREADSHEETS, or similar form of spreadsheet. The central managing component may copy information from the data cube into the spreadsheet, and may also include one or more controls in the spreadsheet that allow a user to interact with the spreadsheet so as to obtain additional information from the data cube. For example, a hyperlink may be provided in the spreadsheet, whose selection by the user may cause a query to be made of the data cube, with additional information being returned to the spreadsheet at the time of the selection of the hyperlink.

At box 216, then, the spreadsheet is fully generated and provided to the user who originally defined the report. For example, the spreadsheet can be attached to an electronic mail message, or can be saved to an accessible location on a server system, and a hyperlink to that location may be sent to the user.

Figure 3:
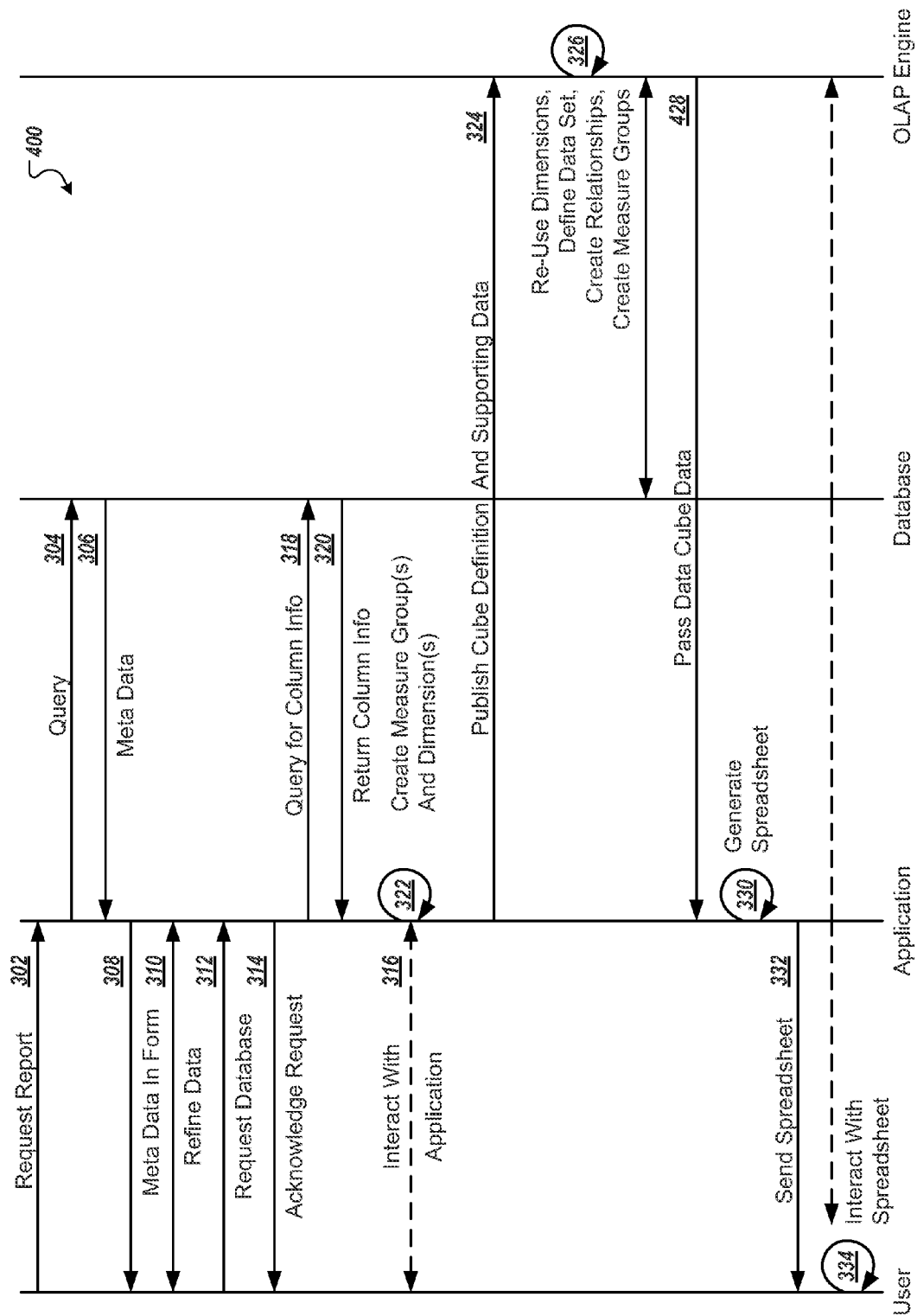
FIG. 3 is an activity diagram that shows actions performed by different components in a computer system.

FIG. 3 is an activity diagram that shows actions performed by different components in a computer system. Again, the process shown here is similar to that described with respect to FIGS. 1 and 2, though it is shown here in more detail with respect to particular components in a system that may perform each of the respective operations. In general, the process here centers around an application that communicates with the other structural components in the system, to simplify a user's interaction with a database system that otherwise might be too difficult for a lay user to employ effectively.

The process begins at activity 302, where a user of a computing device (e.g., desktop or laptop computer, or a smartphone) requests a report from the application. Such a request may initially involve a selection of a database or portion of a database from which the user would like to view and manipulate data. For example, a company with a number of departments may provide the user with a list of different databases, such as sales databases, engineering development databases, databases holding clinical testing documentation (for a medical device maker), and other such databases. The application or another component may then determine whether the requesting user should have access to the data, and may continue if the user should have such information access.

At activity 304, the application queries the relevant database, and the database returns meta data at activity 306. For example, the database may return information about the different tables in the database and the columns of those tables, such as column labels and data types. The information the application needs in order to submit an appropriate query, may be obtained automatically (perhaps with subsequent verification) or manually (e.g., entered by an installer of the application). The data needed by the application may general include the categories of: (a) Objects (e.g., tables or views); (b) Relationships between Objects; and (c) Data Points (e.g., columns in the tables or views).

Assume an implementation that provides for ad hoc reporting at a university. In such an example, the application would need to know

- the physical name of an object (e.g., concepts of Classes, Students, and Teachers, with the table name for Classes being "tblClasses"). The application could retrieve a list of all physical tables, while an installer may specify the tables needed for such reporting, though the application could default to using all the available tables.
- whether a particular table can be used as the basis for a report or is just a supporting table. In our example, a Student table (tblStudent) may have a column that contains a code for the "year" of the student. However, as is typical for a relational database, the data might not be stored in a format that is easy to understand to someone who is not already familiar with the database (e.g., "F" for freshman, "S" for sophomore, "J" for junior, and "R" for senior). A supporting table called tblStudentYear may contain the information to translate the codes in tblStudent to a meaningful description. As such, tblStudent is a reportable object and tblStudentYear is a supporting table.
- What the "friendly" name is for any reportable object. In our example, tblStudent should be displayed to the user as "Students", but the user never needs to see tblStudentYear directly and so it doesn't need a friendly name. The application could thus default to the physical name of the table.

The application would then need to know how the objects relate to each other, such as by knowing:

- what columns can be used to join two tables together. In our example, there is a relationship between tblStudent and tblStudentYear. In tblStudent, there is a column called CurrentYearCode and in tblStudentYear, there is a column called YearCode. In some relational databases, the relationships between tables exist as part of the structure (called a foreign key). If that is available, the application can pull it and have an installer validate it. However, the application may not be able to count on such data being available.

the types of the relationships (e.g., One to One, One to Many, Many to One, or Many to Many). The application may use such relationships to drive the report building, but such knowledge may not be required for cube building. For example, such knowledge may come into play when a user adds a column to a report. If the user is viewing a student report, then they would have an expectation that there is one row per student. If they add a column to the report called "course name", they would have more than one row per student and therefore not have an easy way to find out how many students matched the criteria they selected. So, the application can require that any column that has a one to many or many to many relationship with a report be aggregated. A user could add the "count" function to the "course name" column to add it to their student report.

a breadcrumb description. A breadcrumb is used to show the user the context of a data point they are viewing. The context of a data point is determined by its path from a main reporting table, and the breadcrumb shows that path to the user. In the university database example, there is an obvious relationship from students, to classes, to teachers. There is also a relationship from students to teachers directly when a teacher is a student's advisor. If a teacher's name shows up on a report, the user needs to know if that teacher is teaching a class that student is in or if they are advising the student. The meaning of "teacher's name" depends on the context (or path) of how the application got from the student to the teacher. The path is created by concatenating the breadcrumbs together: Student's Class's Teacher's Name. A similar approach may be achieved by using table names, though such an approach would be less user friendly.

The application would also need to know particular data points for the data, as columns in the tables. For example, the application may need to know:

The physical name of the table the column belongs to (e.g., the column "CurrentYearCode" belongs to tblStudent)

The friendly name of the data point (e.g., "Current Year" for the column "CurrentYearCode")

the data type of the column (e.g., date, number, text, Boolean). The application uses this information to determine what functions are available for a column. There are two types of functions in this implementation: Scalar (or Single) and Aggregate. Scalar functions apply to a single piece of data, e.g., "Round" would take a single number and round it to the nearest whole number. Aggregate functions apply to a set of data, e.g., "Max" would take a set of data and give you the largest single value. Each function of the application can have an input data type and an output data type. For example, the Day of the Month function can have a Date input type and a number output type. It would take in Dec. 13, 2011 and return 13. The application can provide a list of available functions to a user based on the input type of the data point and the number of rows (aggregate or scalar). In addition to the functions that the application provides the user by default, it may also allow the installer to provide additional functions. In the university example, every Class would have a name and a number, e.g., "Econ" and "101". Even though the "101" is a number, a user would not want to allow the users to sum all the student's course numbers together because that would make no sense. In such a case, the application may allow the installer to specify that the class number data point can use the aggregate functions "Count", "Max", "Min", and "Count Distinct".

Whether a particular column is a "lookup." A lookup is a column that has a finite set of possible values. The application uses such information to provide a drop down list of possible values to the user when they are filtering a report. For example, "Teacher Department" might have a list of 20 departments in a drop down so the users could filter for only "Math" or "English" teachers. Teacher Name would probably not be a lookup because a Teacher's name could be anything. "Course Building" would be a lookup because there is a finite list of buildings on the campus. Whether a column should be lookup or not is not always clear, of course, and may depend on user preferences. If a column is a lookup, the application builds the list of available values by looking at the data, which requires an installer to tell the application where to find the display value. Using the previous example of CurrentYearCode in tblStudent, the display value is in tblStudentYear. The application would display "Sophomore" and "Senior" to users. The application would also need to know the ranking value for the column so that users can say "give me the list of students with a year between 'Sophomore' and 'Senior'." If the application uses the display value to do that comparison alphabetically, it would not find "Junior" even though one knows that should come between those two values. To solve that problem, the application can allow users to provide a rank that is different from the display.

The application uses such information to allow users to create a report that is a two dimensional structure that has rows and columns. When the user is satisfied that they have a report with the rows and columns that interest them, they can hit an "analyze" button and have the report run for them.

The application then formats the receive meta data and provides it to the user at activity 308. The user is then enabled to interact with the meta data so as to define a report for the user to see from the data (activity 310). For example, the user can define particular fields or columns that the user wants to review. Also, the user can identify ranges in data that the user wants to review, such as typically time ranges for all forms of data, geographic ranges for sales data, and the like. Such interaction may be made directly with the application, such as by refining a form that shows the relevant fields and other information. The interface for such interaction may be a graphical user interface such as via the screen shot shown below in FIG. 4.

The user then requests the creation of a simplified database at activity 412. Such a request may simply involve the user selecting a "submit, "analyze," or similar button on a form the user has been employing in order to define the report. The request in this example is directed to the application, which as a result of receiving the request, begins a pair of asynchronous but simultaneous operations.

First, as indicated by activity 314, the application may continue interacting with the user, first by transmitting an acknowledgment to the user which indicates that the application properly received the request and has triggered the processing of the request. The application may also determine, by itself, or in cooperation with the database and/or OLAP engine, how long the processing will likely take to complete. Such a determination can be made in standard manners, and may take into account the number of dimensions in the cube, the number of records, and the number of groups, in addition to the types of the data fields and the type of computations to be made in generating the report (e.g., computations on floating point numerals may take longer than computations on integers). The determination of whether the request can be processed properly may also be made by the application alone or in combination with the database and/or OLAP engine.

At activity 316, and in parallel with the other actions described next, the application can continue interacting with the user via the user interface discussed above and below. For example, the user may further refine the parameters for his or her report and may re-run the report with the refinements (and may transmit a request to cancel the running of the prior report that had been started, which message may be forwarded by the application to the OLAP engine and/or database. Also, the user may begin defining a wholly new report, such as by loading the parameters of a previously-submitted report or by entering new parameters from scratch. Such interaction by the user may occur iteratively, whereby the user may begin the execution of multiple reports in the manners discussed here, and each of those reports may be returned to the user, e.g., as a spreadsheet containing a picot table, in turn, while the user continues to define additional reports or additional revised versions of previously-submitted reports, which may include the reports that are currently being processed.

At activity 318, the application queries the database to obtain column information for the database. Such information identifies the various columns that are defined in the database for tables represented in the database. The application may have already gone through each data point in the system and created a dimension for each lookup column using the list of available values. In our university example, there would already be a dimension for CurrentYearCode that is ranked correctly so that the values show up in the right order. Also, assume there is a student language data point. The application may then generate a dimension for the language that lists all the language values (e.g., Chinese, English French, etc.) spoken by the students. The application may also have already created some generic dimensions that don't apply to any specific column, but that provide value to users. For example, there is a generic dimension for dates, Boolean values, and numbers. They each have hierarchies and attributes that allow users to slice (or group) their data in a number of different ways. For example, a generic date dimension may have a hierarchy having a year as a root note, a quarter as a next deeper level, a month at a deeper level, and a particular day at a terminal level. Similarly, a Month of Year attribute may simply have a single level, with twelve values in that level. Numerals may also have a hierarchy, e.g., with root values of 0, 1000, 2000, 3000 etc.; with values filling the next position at the next deeper node (e.g., 1000, 1100, 1200, 1300, etc.); with values at the next deeper node filling the next position (e.g., 1100, 1110, etc.); and so on.

When a user clicks "Analyze" or a similar selection, the application will pass through each column in the report to look for columns that should be associated with one of the dimensions that have already been built. In the case of our example report, the "Count Of Current Courses" and "Tuition Paid" columns' output would be associated with a generic numeric dimension, the "Current Year" column would be associated with a Student Year dimension that was already built, the "Application Date" would be associated with a generic date dimension, and the "Graduated" column would be associated with a generic Boolean dimension.

The application then passes back through each column to look for measures to create. The application looks at each data point to see if it has an aggregate function that could have been applied when building the report. For example, "Tuition Paid" can have four aggregate functions that would have shown up for that data point if there was ever a set of values: Min, Max, Sum, and Average. The application may create a measure for each of those functions on that data point. Also, if a data point has already been aggregated and the output is a number (such as the "Count of Current Courses" column), the application can apply Min, Max, Sum, and Average to the column. The application can also automatically create a measure for the count of report "items". In this example, there would be a count of students measure created automatically.

At activity 320, the database returns the column information, and at activity 322, the application executes to create measure groups and dimensions for defining a hyper cube for the data, as just discussed.

With the parameters of the hyper cube defined by the application, the application publishes the cube definition to the OLAP engine and also provides it with supporting data for generating the cube and obtaining simplified information from the cube (activity 324).

At activity 326, the OLAP engine identifies parameters that it has previously created for reports—e.g., for previous times that it has created the same report using the same parameters (though using different parameter values such as a different time ranges). Such previous parameters may include prior dimensions, data set definitions, created relationships, and created measure groups. Such re-use of prior parameters may save time and processing cost in that certain shortcuts can be taken in building only "deltas" for a cube compared to the last time the cube was produced.

As part of activity 326, the OLAP engine may also interact with the database to obtain additional information needed to generate the current cube, including "delta" information such as entries form a database that represent transactions from a time period for the current report that is outside the time of a previously-run report.

At activity 327, the data cube has been generated and the OLAP engine passes information about the data cube that corresponds to the request report back to the application.

At activity 330, the application generates a spreadsheet in a format such as MICROSOFT EXCEL (e.g., *.xls) or GOOGLE DOCS AND SPREADSHEETS that can be analyzed by the user. The particular format of the spreadsheet may be selected from a plurality of different types by identifying a spreadsheet type in a profile for the particular user, where the user may have set the spreadsheet type when he or she established an account with the system.

At activity 332, the application sends the spreadsheet to the user. Such sending may occur by attaching a spreadsheet file to a message (e.g., an e-mail message) sent to the user, or by sending hyperlinks that point to the file that is stored elsewhere, such as at a network-accessible location. Upon receiving access to the spreadsheet, the user at activity 334 interacts with the spreadsheet. Such interaction may take typical forms, such as by filtering particular columns, hiding columns, generating sums and other functions on the data, and the like. The user can thus treat the cube like a pivot table in the spreadsheet. In the university example, as one indication, Tuition Paid can be both a measure and a dimension because it qualified for both roles. The user could use the Tuition Paid dimension to group students into bands of $10,000 and to see the count of students by "Current Year." All of the columns from the report except "Student Name" and "Student ID" are thus represented in the cube.

As shown by the dotted line to the OLAP engine, the interaction may also cause the spreadsheet to communicate with the OLAP Engine. For example, the spreadsheet may be encoded to have various hyperlinks (or URI's) directed to the OLAP engine and to the particular data cube that was used to generate the spreadsheet. A user may select such hyperlinks to obtain additional information that is not initially present in the spreadsheet.

Figure 4:
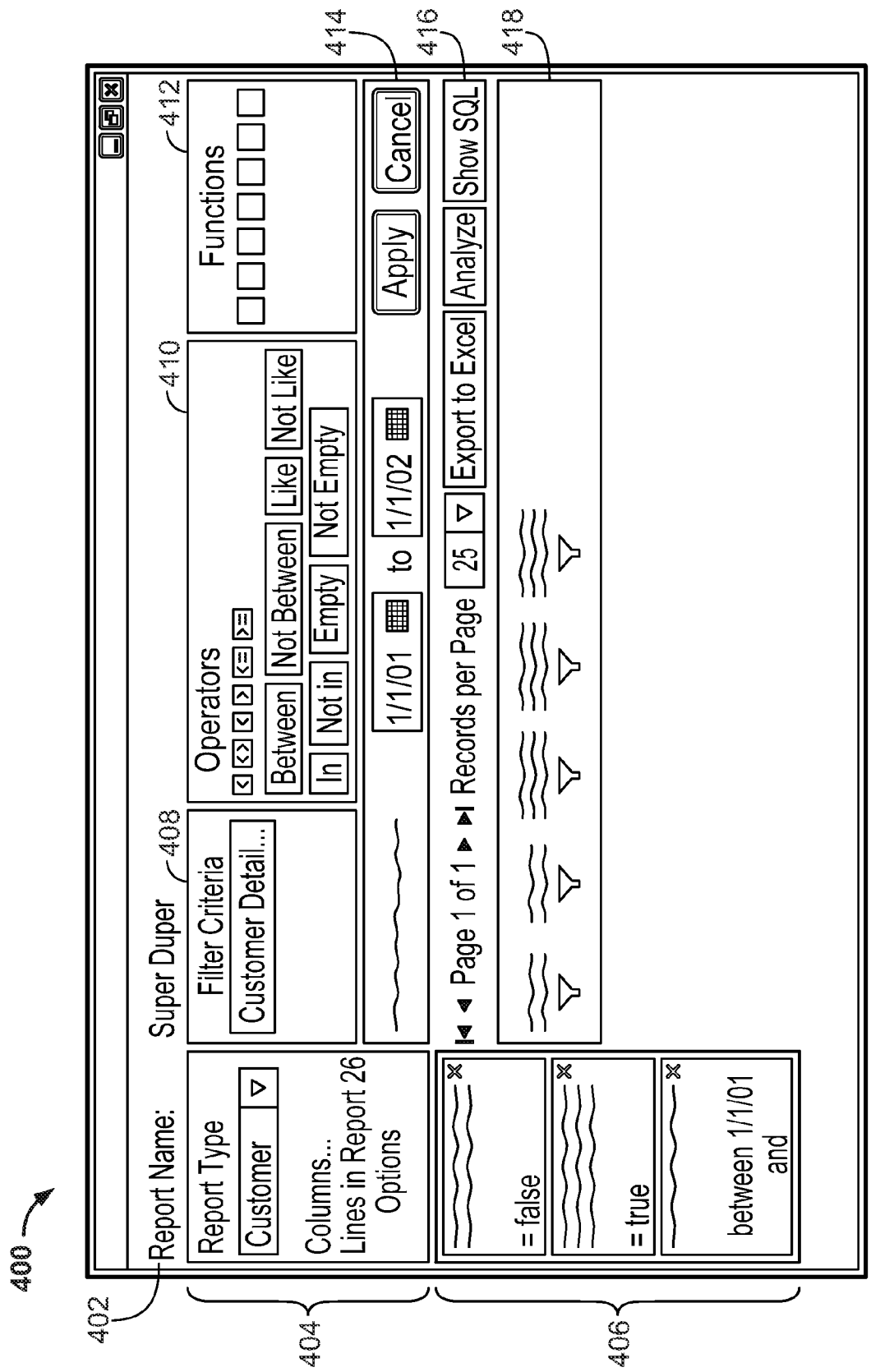
FIG. 4 is a screen shot of an application for interacting with users of a computer system who are accessing information from a complex database.

In sum, the application may allow a user to choose from any field that the application knows about to build their own cube. It would be impractical in a large data warehouse to put all data points (e.g., hundreds of them) in a one cube. But using the application described here, a user can combine any data points that they would like to produce a cube on their own, without the need for specialized IT staff to help them. As a result, users can try more things and get results effectively immediately—even at night and on weekends. They can then iterate from initial results to obtain even better and more-specific results that are particularly responsive to their special, current needs, FIG. 4 is a screen shot of an application for interacting with users of a computer system who are accessing information from a complex database. The application 400 may be used to provide a user interface 400 by which a user may interact with a system for generating simplified reports from complex databases such as relational databases managed by a relational database management system that does not otherwise have such a system for providing simplified user interaction of the form shown here. In particular, the user interface 400 may correspond to steps indicated as occurring with a user in the discussions of FIGS. 2 and 3 above.

Referring now more particularly to the particular components of the user interface 400, a report name 402 simply indicates the name of a report that is currently being defined by a user. The user may be allowed to name reports so that they can be saved and later modified and/or re-run. Reports may also be saved under a new name, such as after a user has made modification to a prior report definition. In this example, the user has named the particular report "Super-Duper."

Component 404 is an options pane that includes a drop-down menu for selecting a report type. In one example, a relatively short list of predefined report types may be provided by the system. In a typical sales organization, the report types can include: a customer report (with queries that create reports based on customers, where each line in a report is associated with a particular customer); a customer hold report (creates reports with one line for each customer who is on hold, or waiting approval to purchase goods); order reports (queries based on orders, where there is one order per line in the report); order payment reports (queries based on payments for orders by customers, where there is one paid order per line in the report); and product reports (a report that devotes one line to each available product). Also, an extra folder or folders may be provided when t user selects the pull down, and may list the titles of previous reports that the particular user has defined, and/or reports defined by other members of an organization but made available to others in the organization.

Also in component 404 is a number that represents the total number lines from the last time the report of this name was run. It also displays a "columns" control that allows a user to add, remove, or modify the columns of data that will be returned in a report.

Component 406 is a series of filters that the user has previously defined for the report. Each filter is displayed with text that defines the condition, and separate text (e.g., "=false") that defines the value of the condition to be met by the filter. Hidden or default filters may also be applied by the system itself, but are not shown here, such as to remove software development test data from any report or to remove information about employees of the organization that operates the reporting system.

Component 408 shows criteria choices that a user may select. The choices reflect criteria that a user may select for applying a filter. Such choices may be organized hierarchically and presented as a cascading expanding series of drop-down menus. A user can drag across such menus to ever-greater levels of detail in order to define criteria to a sufficient level of specificity.

Component 410 shows user-selectable controls for defining operators for a report. The operators may take standard Boolean and other logical forms, such as less than, greater than, and equal to, in addition to empty and not empty. Such operator choices allow a user to include or exclude data that will be returned with a report.

Component 412 displays user-selectable controls for a variety of functions. The functions permit a user to change details regarding the values of an operator the user has selected. Component 414 is a function box with which a user enters values of parameters the user has selected in order to define the data to be shown in a report. For example, the component 414 may receive user-specified date ranges for data in a report (e.g., all sales between date X and date Y).

Component 416 includes selectable controls for defining the format of any resulting report. For example, a user can defined the number of records that he or she wants to see on a single page. Also, the user can choose a control to show SQL for the report—where the SQL is generated from the parameters that the users has input thus far. Such translation may occur sing standard rules to map parameters entered by the user to certain SQL commands. The component 416 also includes a selectable control to export to excel ad one to analyze the data, which may be selected by a user to start the processing of a data cube in the manners discussed above for FIGS. 2 and 3.

Component 418 is the data columns that the user has defined for their report. The component 418 shows the columns that will be displayed in a spreadsheet or other appropriate form in the simplified format that the system delivers to the user. Each column in this example has the ability to generate a filter based on its particular data (as shown by the selectable funnel icons at the bottom of each column).

By these mechanisms, then, the user interface 400 may be employed to allow a user to interact easily with a DBMS and a data cube, by allowing the user to, in a simplified manner, enter parameters of a report definition that can then be interpreted by an application such as application 102 in FIG. 1 and used to control the interaction of a database and OLAP engine, such as database 104 and OLAP engine 106 in FIG. 1.

Figure 5:
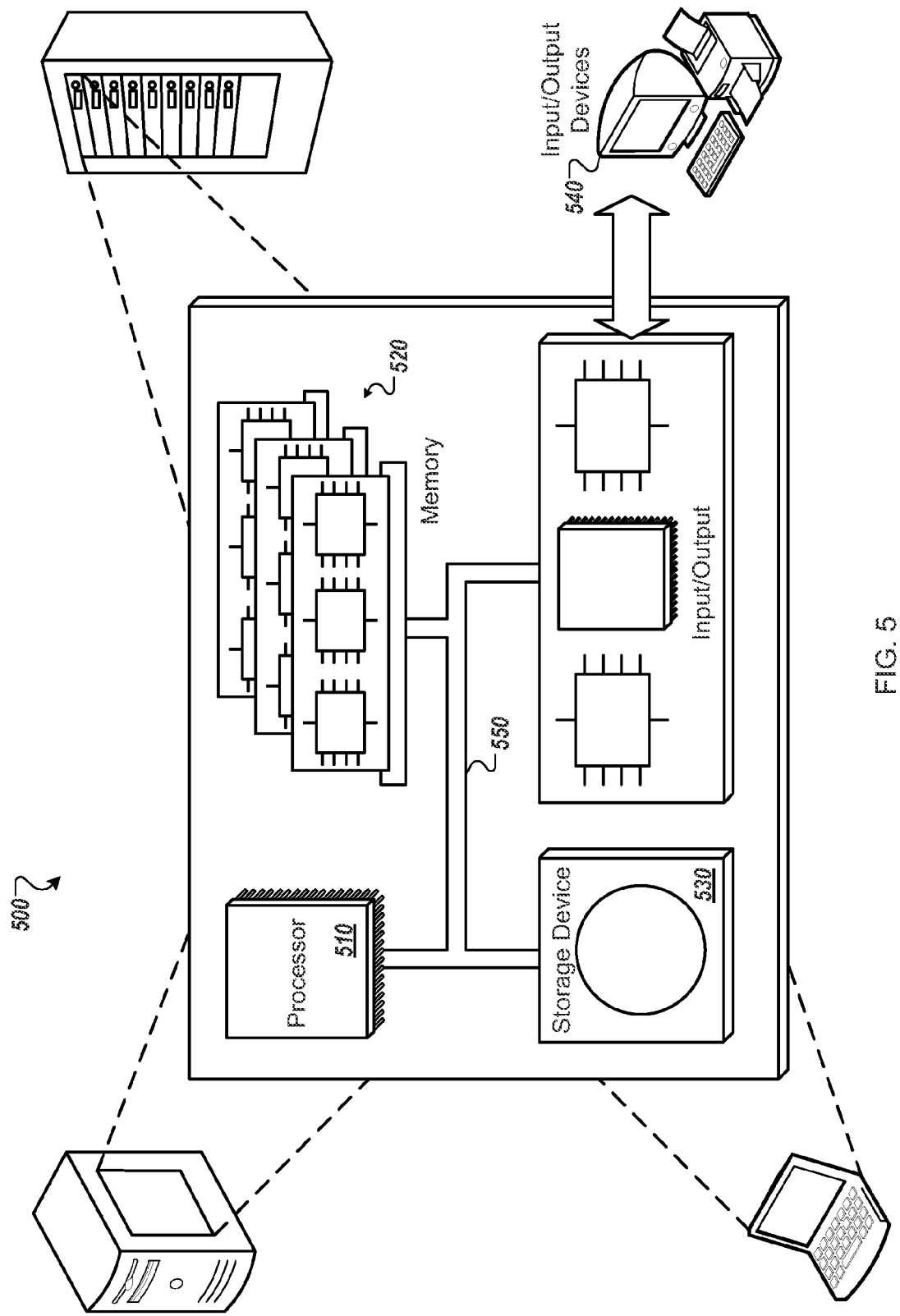
FIG. 5 shows an example of a computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. The device may be provided with a subscriber identity module (SIM) card that stores a key for identifying a subscriber with a telecommunications carrier to enable communication through the carrier. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for processing data in a database using a data cube, the method comprising:

receiving, at an application executing on a computer system, a request from a user for a report relating to a group of data in a database;

querying the database with the application to obtain meta data about the group of data;

identifying, by the application and based on the obtained meta data, field descriptors of one or more fields in the group of data;

providing, by the application, the field descriptors for review by the user;

receiving, from the user and by the application, selections based on the provided field descriptors;

querying the database with the application and based on the received selected field descriptors to identify aggregable columns in the group of data to be included in the requested report;

creating, by the application, measure groups of aggregable columns in the group of data to be included in the requested report, wherein the measure groups are identified by the application based on the aggregable columns identified by the application;

creating, by the application, a data cube definition based on the selected field descriptors and the measure groups created by the application;

publishing, with the application, the data cube definition and other information about the group of data to an online analytical processing (OLAP) engine that is separate from the application;

receiving, at the application and from the OLAP engine, a data cube based on the data cube definition and comprising data obtained from the database relating to the group of data;

generating, in response to receiving the data cube by the application, a simplified flat-file model of the group of data based on the received data cube, wherein the simplified flat-file is generated without additional user input to the application; and providing, by the application, the generated simplified flat-file model as the requested report in a form that can be reviewed and directly manipulated by the user.

2. The computer-implemented method of claim 1, wherein the simplified flat-file model comprises a computer spreadsheet to which the user is given access.

3. The computer-implemented method of claim 1, further comprising, after receiving the selected field descriptors from the user, notifying the user that the simplified flat-file model will be provided in the future, and allowing the user to interact with the application while the simplified flat-file model is generated.

4. The computer-implemented method of claim 1, wherein generating the simplified flat-file model comprises mapping data from the data cube to a spreadsheet pivot table.

5. The computer-implemented method of claim 1, wherein
providing, by the application, the field descriptors for review by the user comprises providing fields from a report to the user, and
receiving, from the user and by the application, selections based on the provided field descriptors comprises receiving one or more commands from the user to filter the fields for ranges identified by the user.

6. The computer-implemented method of claim 1, wherein querying the database with the application to identify aggregable columns in the group of data to be included in the requested report comprises identifying columns in the database as being aggregatable as one or more of an average, a count, and a sum.

7. The computer-implemented method of claim 1, further comprising:
querying the database with the application and based on the received selections to identify columns in the database having a finite number of values; and
creating, by the application, cube dimensions for columns identified as having a finite number of values.

8. The computer-implemented method of claim 7, wherein publishing the data cube definition and other information comprises:
creating relationships between the group of data and a data source for the dimensions; and
creating one or more measures for the cube.

9. The computer-implemented method of claim 8, further comprising identifying by the application dimensions that are preexisting on a server system and re-using dimensions that are identified as being preexisting on the server rather than recreating the preexisting dimensions.

10. A computer program stored in a non-transitory computer readable storage device, the computer program comprising instructions that when executed by a processing device cause the processing device to perform operations comprising:
receiving, at the processing device, a request from a user for a report relating to a group of data in a database;
querying the database by the computer program to obtain meta data about the group of data;
identifying, by the computer program and based on the obtained meta data, field descriptors of one or more fields in the group of data;
providing, by the computer program, the field descriptors for review by the user;
receiving, from the user and by the computer program, selections based on the provided field descriptors;
querying the database with the computer program and based on the received selected field descriptors to identify aggregable columns in the group of data to be included in the requested report;
creating, by the computer program, measure groups of aggregable columns in the group of data to be included in the requested report, wherein the measure groups are identified by the application based on the aggregable columns identified by the computer program;
creating, by the computer program, a data cube definition based on the selected field descriptors and the measure groups created by the computer program;
publishing, by the computer program, the data cube definition and other information about the group of data to an online analytical processing (OLAP) engine that is separate from the computer program;
generating, in response to receiving the data cube by the computer program, a simplified flat-file model of the group of data based on the received data cube, wherein the simplified flat-file model is generated without additional user input to the application; and
providing, by the computer program, the generated simplified flat-file model as the requested report in a form that can be reviewed and directly manipulated by the user.

11. The computer program of claim 10, wherein the simplified flat-file model comprises a computer spreadsheet to which the user is given access.

12. The computer program of claim 10, wherein querying the database with the application to identify aqgregable columns in the group of data to be included in the requested report comprises identifying columns in the database as being aggregatable as one or more of an average, a count, and a sum.

13. The computer program of claim 10, the operations further comprising:
querying, by the computer program, the database based on the received selections to identify columns in the database having a finite number of values; and
creating, by the computer program, a cube dimension for columns identified as having a finite number of values.

14. The computer program of claim 13, wherein publishing the data cube definition comprises:
creating relationships between the group of data and a data source for the dimensions; and
creating one or more measures for the cube.

15. The computer program of claim 14, the operations further comprising identifying by the computer program dimensions that are preexisting on a server system and re-using dimensions that are identified as being preexisting on the server rather than recreating the preexisting dimensions.

16. A computer-implemented automatic data manipulation system, comprising:
a data processing apparatus;
a data storage device storing:
a relational database storing data in a plurality of interrelated tables of data; and
an online analytical processing (OLAP) engine arranged to communicate with the relational database and process data from the relational database into a data cube; and
a memory device storing instructions, separate from the database and the OLAP engine, that when executed by data processing apparatus cause the data processing device to perform operations to:
receive a request from a user for a report relating to a group of data in a database;
query the database to obtain meta data about the group of data;
identify, based on the obtained meta data, field descriptors of one or more fields in the group of data;
provide the field descriptors for review by the user;

receiving, from the user, selections based on the provided field descriptors;

query the database based on the received selected field descriptors to identify aggregable columns in the group of data to be included in the requested report;

create measure groups of aggregable columns in the group of data to be included in the requested report, wherein the measure groups are identified based on the identified aqgregable columns;

create a data cube definition based on the selected field descriptors and the created measure groups;

publish the data cube definition and other information about the group of data to the OLAP engine;

receive, from the OLAP engine, a data cube based on the data cube definition and comprising data obtained from the database relating to the group of data;

generate, in response to receiving the data cube, a simplified flat-file model of the group of data based on the received data cube, wherein the simplified flat-file is generated without additional user input to the data processing apparatus; and provide the generated simplified flat-file model as the requested report in a form that can be reviewed and directly manipulated by the user.

17. The computer-implemented system of claim 16, wherein the simplified flat-file model comprises a computer spreadsheet to which the user is given access.

18. The computer-implemented system of claim 16, wherein querying the database to identify aqgregable columns in the group of data to be included in the requested report comprises identifying columns in the database as being aggregatable as one or more of an average, a count, and a sum.

19. The computer-implemented system of claim 16, further comprising:
   querying the database based on the received selections to identify columns in the database having a finite number of values; and
   creating a cube dimension for columns identified as having a finite number of values.

20. The computer-implemented system of claim 19, wherein publishing the data cube definition comprises:
   creating relationships between the group of data and a data source for the dimensions; and
   creating one or more measures for the cube.

21. The computer-implemented system of claim 20, further comprising identifying database dimensions that are preexisting on a server system and re-use dimensions that are identified as being preexisting on the server rather than recreating the preexisting dimensions.

* * * * *